United States Patent
Ito et al.

(10) Patent No.: US 11,364,957 B2
(45) Date of Patent: Jun. 21, 2022

(54) REAR VEHICLE-BODY STRUCTURE OF VEHICLE

(71) Applicant: MAZDA MOTOR CORPORATION, Hiroshima (JP)

(72) Inventors: Hajime Ito, Hiroshima (JP); Hiroaki Ishizu, Hiroshima (JP); Akiyoshi Masuda, Hiroshima (JP); Shunsuke Hirai, Hiroshima (JP); Yuuki Sano, Hiroshima (JP); Masashi Notomi, Hiroshima (JP); Takumi Fukuda, Hiroshima (JP); Hidemitsu Shinhara, Hiroshima (JP); Masahiro Awane, Hiroshima (JP); Hidekazu Shiraishi, Hiroshima (JP); Yasuhiko Nishida, Hiroshima (JP); Takanori Yoshida, Hiroshima (JP); Ken Yamada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 75 days.

(21) Appl. No.: 17/054,914

(22) PCT Filed: Jun. 14, 2019

(86) PCT No.: PCT/JP2019/023671
§ 371 (c)(1),
(2) Date: Nov. 12, 2020

(87) PCT Pub. No.: WO2019/244792
PCT Pub. Date: Dec. 26, 2019

(65) Prior Publication Data
US 2021/0214016 A1    Jul. 15, 2021

(30) Foreign Application Priority Data
Jun. 19, 2018    (JP) .............................. JP2018-116144

(51) Int. Cl.
*B62D 25/20* (2006.01)
*B62D 25/08* (2006.01)
*B62D 21/15* (2006.01)

(52) U.S. Cl.
CPC ....... *B62D 25/2027* (2013.01); *B62D 25/088* (2013.01); *B62D 21/152* (2013.01); *B62D 25/2036* (2013.01)

(58) Field of Classification Search
CPC  B62D 25/2027; B62D 25/088; B62D 21/152; B62D 25/2036
See application file for complete search history.

(56) References Cited

U.S. PATENT DOCUMENTS

| 6,234,568 B1 | 5/2001 | Aoki | |
| 2017/0088189 A1* | 3/2017 | Saeki | ................. B62D 25/2027 |
| 2018/0170433 A1* | 6/2018 | Salmons | ............ B62D 25/2036 |

FOREIGN PATENT DOCUMENTS

| JP | 2000-142460 A | 5/2000 |
| JP | 2011-240822 A | 12/2011 |

(Continued)

OTHER PUBLICATIONS

International Search Report issued in PCT/JP2019/023671; dated Jul. 30, 2019.

(Continued)

*Primary Examiner* — Lori L Lyjak
(74) *Attorney, Agent, or Firm* — Studebaker & Brackett PC (57) ABSTRACT

Provided is a rear vehicle-body structure of a vehicle, capable of reducing vibrations transmitted from a rear wheel to a floor panel, while ensuring required performance for rear side frames and a cross member. The rear vehicle-body structure comprises a symmetric pair of frame members extending in a vehicle longitudinal direction along respective lateral sides of a rear of a vehicle body of the vehicle, (Continued)

and a rear-side rear cross member bridging the symmetric pair of frame members in a vehicle width direction, wherein an attachment portion between each of the frame members and the rear-side rear cross member provided with rigidity difference generation part to generate a rigidity difference between the frame member and the rear-side rear cross member.

10 Claims, 9 Drawing Sheets

(56) References Cited

FOREIGN PATENT DOCUMENTS

| JP | 2013-023049 A | 2/2013 | |
|---|---|---|---|
| WO | WO-2018012292 A1 * | 1/2018 | ............. B60K 13/04 |

OTHER PUBLICATIONS

International Preliminary Report on Patentability and Written Opinion issued in PCT/JP2019/023671; dated Dec. 22, 2020.

* cited by examiner

(a) Rigidity Difference: Small (b) Rigidity Difference: Large

REAR VEHICLE-BODY STRUCTURE OF VEHICLE

TECHNICAL FIELD

The present invention relates to a rear vehicle-body structure of a vehicle, which comprises a symmetric pair of rear side frames extending in a vehicle longitudinal (front-rear) direction along respective lateral sides of a rear of a vehicle body of the vehicle, and a cross member bridging the pair of rear side frames in a vehicle width (right-left or lateral) direction.

BACKGROUND ART

Heretofore, as a rear vehicle-body structure of a vehicle, there has been known a structure which comprises: a rear floor panel composing a rear floor of a vehicle body of the vehicle; a symmetric pair of rear side frames extending in a vehicle longitudinal direction along respective lateral sides of the rear floor panel; and a cross member bridging the symmetric pair of rear side frames, across the rear floor panel, wherein a damper support portion is provided in each of the rear side frames or in the vicinity thereof to support a respective one of a pair of dampers equipped in a rear wheel suspension.

In this structure, there is concern that vibrations input from the rear suspension, particularly the dampers, during traveling of the vehicle, are transmitted from the symmetric pair of rear side frames to the cross member, and further transmitted from the cross member to the rear floor panel, thereby causing the rear floor panel to vibrate and thus exerting a negative influence on NVH performance.

Meanwhile, it is reported that, as means to reduce vibrations transmitted from outside a vehicle, it is effective to block vibration transmission between two vehicle members connected to each other, in a connection area therebetween. For example, in the following Patent Document 1, there is disclosed a configuration in which two vehicle members are connected through a vibration reduction member (30).

However, in this configuration, it is necessary to add the vibration reduction member (30) between the two vehicle members. This leads to an increase in the number of components. Further, since this configuration is based on the assumption that a vibration reduction member (30) having a high viscoelasticity is interposed between the two vehicle members, there is a possibility that required performance other than the vibration reduction is deteriorated. Thus, it is necessary to compensate for the deterioration. That is, it is necessary to ensure given required performance.

For example, in a configuration in which each of the rear side frames is applied to one of the two vehicle members, and the cross member is applied to the other vehicle member, i.e., in which the cross member is joined to each of the rear side frames through the vibration reduction member (30), there is concern about decrease in rigidity between the cross member and each of the rear side frames, as mentioned above. Specifically, there is concern about whether it is possible to compensate for deterioration in required performance for the rear side frames and the cross member other than the vibration reduction, such as decrease in efficiency of load transmission from the rear side frames to the cross member during a rear impact collision of the vehicle, and decrease in joint strength between each of the rear side frames and the cross member.

CITATION LIST

Parent Document

Patent Document 1: JP 2013-23049A

SUMMARY OF INVENTION

Technical Problem

The present invention has been made in view of the above problem, and an object thereof is to provide a rear vehicle-body structure of a vehicle, which is capable of reducing vibrations transmitted from rear wheels to a rear floor panel, while ensuring required performance for rear side frames and a cross member.

Solution to Technical Problem

In order to achieve the above object, the present invention provides a rear vehicle-body structure of a vehicle, which comprises: a symmetric pair of rear side frames extending in a vehicle longitudinal direction along respective lateral sides of a rear of a vehicle body of the vehicle; a floor panel coupling the symmetric pair of rear side frames together in a vehicle width direction; and a cross member bridging the symmetric pair of rear side frames in the vehicle width direction and connected to a lower surface of the floor panel, wherein an attachment region between each of the rear side frames and the cross member is provided with rigidity difference generation means to generate a rigidity difference between the rear side frame and the cross member.

In the rear vehicle-body structure of the present invention having the above feature, vibrations input from rear wheels to the cross member through the rear side frames and transmitted from the cross member to the floor panel can be blocked before being input from the rear side frames to the cross member. Thus, there is no need for interposition of a vibration reduction member having a high viscoelasticity. Therefore, the rear vehicle-body structure of the present invention can reduce vibrations transmitted from the rear wheels to the floor panel while ensuring required performance for the rear side frames and the cross member.

Preferably, in the rear vehicle-body structure of the present invention, the rigidity difference generation means has a configuration allowing the cross member to be reduced in terms of rigidity, relative to the rear side frame, in the attachment region between the rear side frame and the cross member.

According to this feature, it is possible to obtain the vibration reduction effect while reducing the weight of the vehicle body.

More preferably, in the above rear vehicle-body structure, the cross member has a lower wall portion, a front wall portion and a rear wall portion forming, respectively, a lower surface, a front surface and a rear surface of the cross member, and a joint portion joined to the floor panel, wherein the lower wall portion and each of the front and rear wall portions are continuously formed through a ridge extending in the vehicle width direction, and wherein a vicinity of an attachment portion of the cross member with respect to the rear side frame has a concave notch formed to define a space with respect to the floor panel without forming the joint portion, while leaving the ridge.

According to this feature, it is possible to block vibrations before the vibrations are input from the rear side frames to the cross member, while ensuring required rigidity for the cross member.

More preferably, in the above rear vehicle-body structure, the attachment portion of the cross member with respect to the rear side frame has a vehicle-widthwise inner surface joint portion joined to a vehicle-widthwise inner surface of the rear side frame, wherein the vehicle-widthwise inner surface joint portion is formed on each side in the vehicle longitudinal direction across the lower wall portion of the cross member, and wherein the concave notch is formed to extend along the vehicle width direction until a vehicle-widthwise outer edge thereof reaches the vehicle-widthwise inner surface joint portion.

According to this feature, it is possible to, in the vicinity of the attachment portion of the cross member with respect to the rear side frame, ensure the joint strength of the cross member to the rear side frame, while relatively reducing the rigidity of the cross member with respect to the rear side frame.

Preferably, in the rear vehicle-body structure of the present invention, a dynamic rigidity ratio of the cross member to the rear side frame is set to 0.3 or more.

According to this feature, it is possible to enhance the vibration blocking effect, while ensuring the rigidity of the cross member.

Effect of Invention

The present invention makes it possible to reduce vibrations transmitted from the rear wheels to the rear floor panel, while ensuring required performance for the rear side frames and the cross member.

DESCRIPTION OF EMBODIMENTS

With reference to the drawings, one embodiment of the present invention will now be described in detail.

In the figures, an arrowed line F, an arrowed line R, an arrowed line L and an arrowed line U denote, respectively, a front side of a vehicle, a right side of the vehicle, a left side of the vehicle and an upside of the vehicle, and an arrowed line out and an arrowed line in denote, respectively, an outer side in a vehicle width (right-left or lateral) direction, and an inner side in the vehicle width direction.

Figure 1:
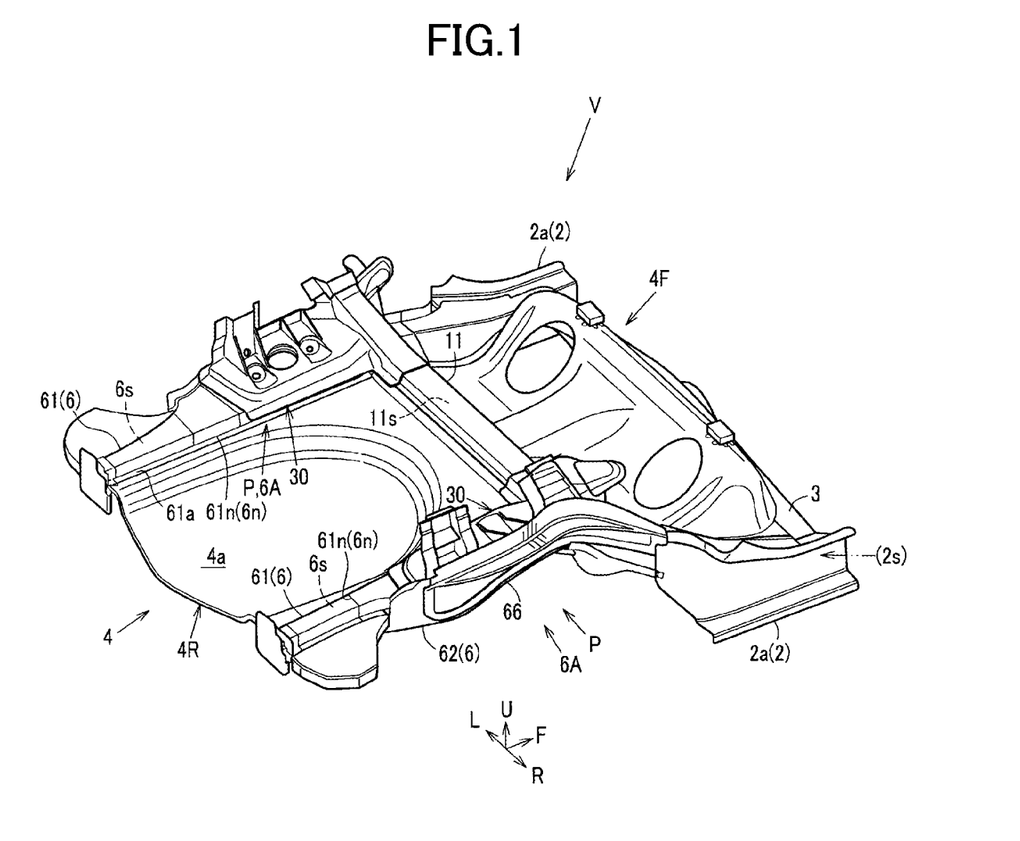
FIG. 1 is a perspective view showing a rear vehicle-body structure of a vehicle according to one embodiment of the present invention, when viewed obliquely downwardly from thereabove.

First of all, mainly with reference to FIGS. 1 to 3, a prerequisite structure of the rear vehicle-body structure according to this embodiment will be described. FIG. 1 is a perspective view showing the rear vehicle-body structure according to this embodiment, when viewed obliquely downwardly from thereabove. Further, FIG. 2 is a bottom view showing the rear vehicle-body structure according to this embodiment, and FIG. 3 is an enlarged sectional view taken along the line A-A in FIG. 2.

Figure 2:
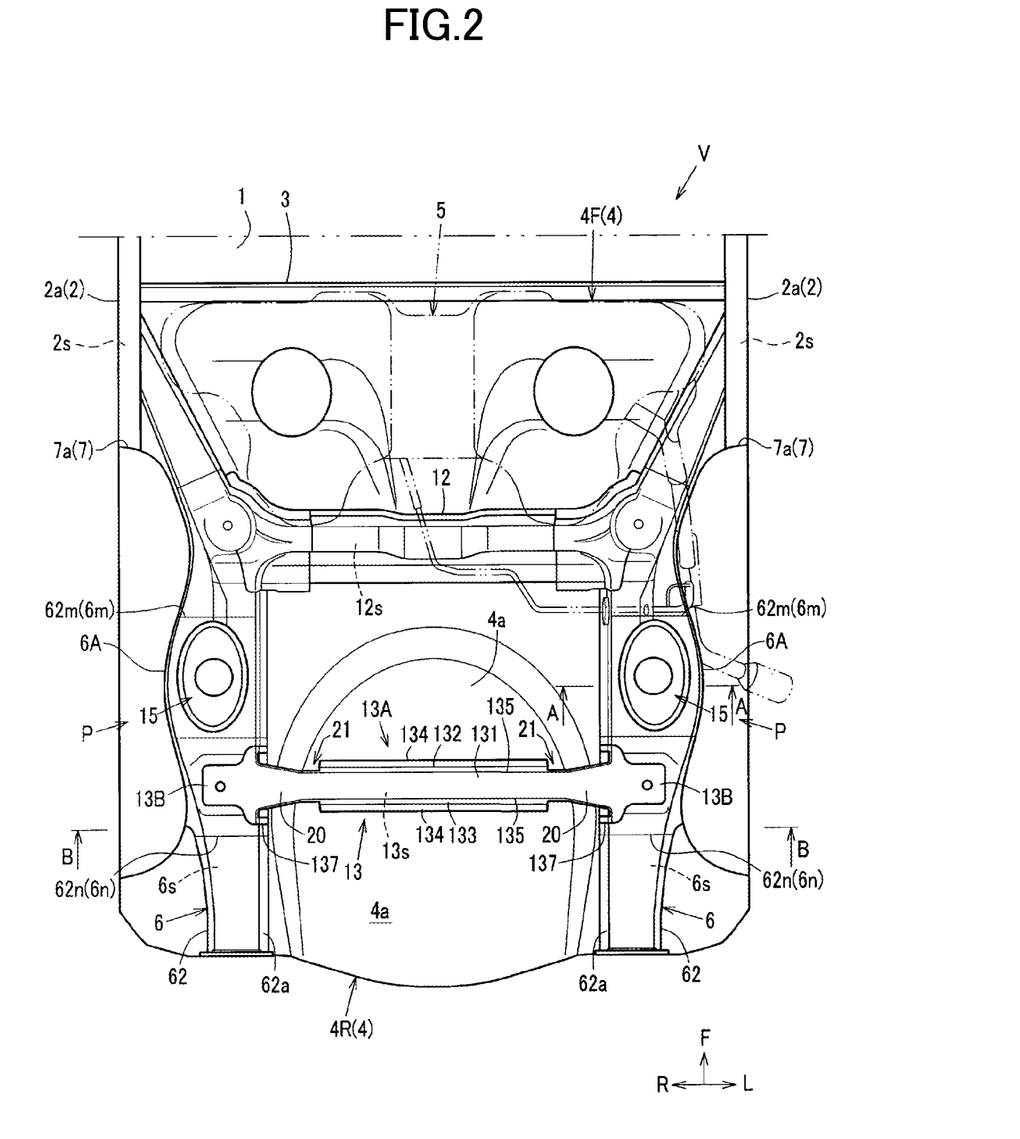
FIG. 2 is a bottom view showing the rear vehicle-body structure according to this embodiment.
Figure 3:
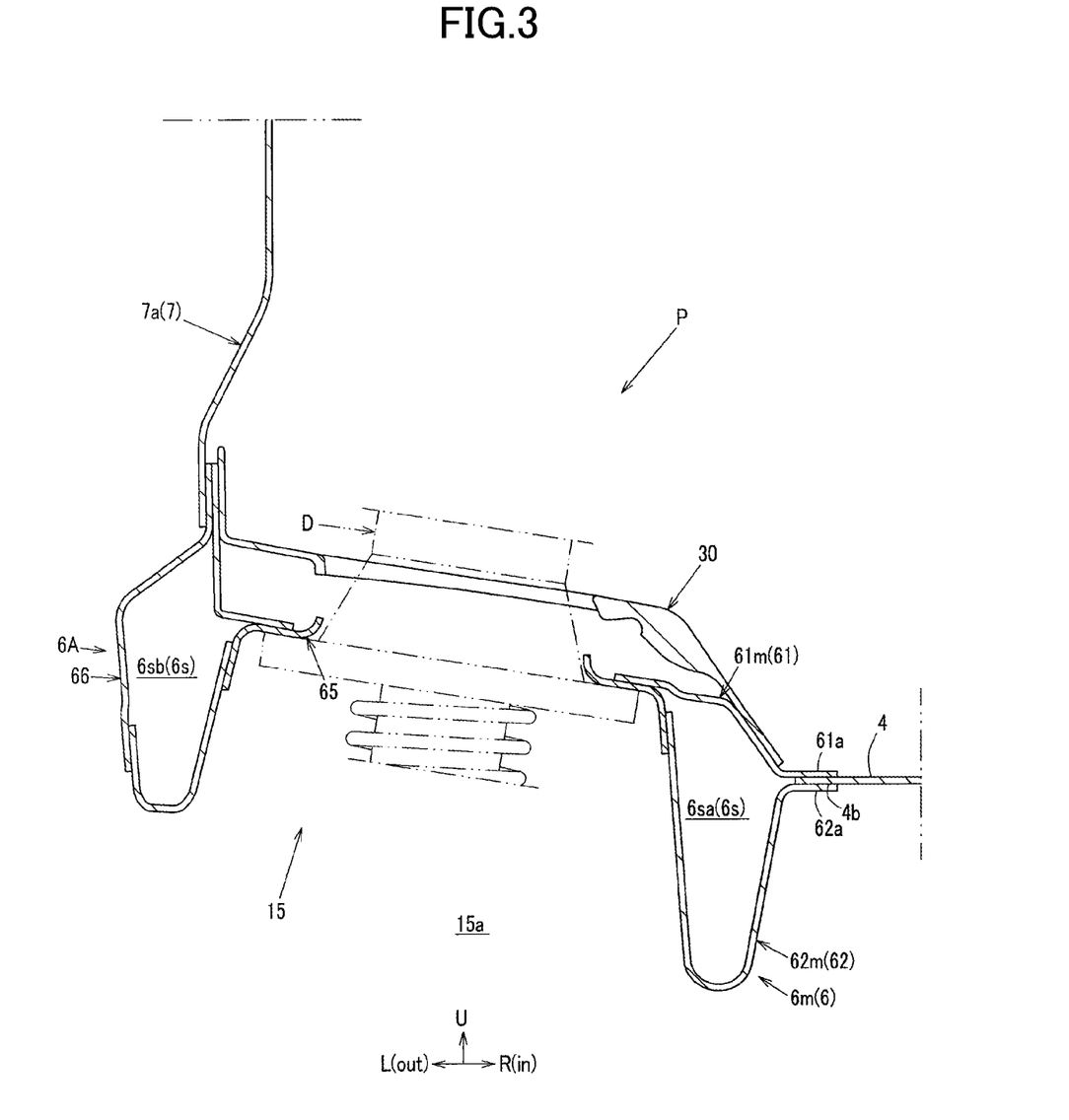
FIG. 3 is an enlarged sectional view taken along the line A-A in FIG. 2.

As shown in FIGS. 1 and 2, a vehicle body of the automotive vehicle is provided with a floor panel 1 (see FIG. 2) forming a floor surface of a passenger compartment, and a pair of side sills 2 are joined and fixed, respectively, to both lateral sides of the floor panel 1, wherein each of the side sills comprises a side-sill inner panel 2a and a side-sill outer panel (its illustration is omitted) which are assembled to form a closed cross-section 2s extending in a vehicle longitudinal (front-rear) direction to serve as a vehicle-body strength member.

A rear floor panel 4 composing a rear floor of the vehicle body is integrally connected to a rear end of the floor panel 1 through a kick-up portion 3 rising upwardly, and a pair of rear side frames 6 (each hereinafter referred to as "frame member 6") extending in the vehicle longitudinal direction are provided, respectively, on both lateral sides of the rear floor panel 4.

A front portion 4F of the rear floor panel 4 (hereinafter referred to as "rear-floor front portion 4F") is configured to allow a fuel tank 5 to be disposed therebeneath (see FIG. 2). This fuel tank 5 is protected by a no-illustrated insulator.

As shown in FIGS. 1 and 2, a rear portion 4R of the rear floor panel 4 (hereinafter referred to as "rear-floor rear portion 4R") is integrally formed with a concave portion 4a additionally serving as a downwardly-concaved spare tire pan or another component, in a vehicle-widthwise middle region thereof.

Each of the frame members 6 is configured as a vehicle-body lateral-side rigid member formed to have a closed cross-section 6s extending in the vehicle longitudinal direction from the kick-up portion 3 to a rear end of the rear floor panel 4, and a front end of each of the frame members 6 is connected to a rear end of a corresponding one of the side sills 2.

Figure 8:
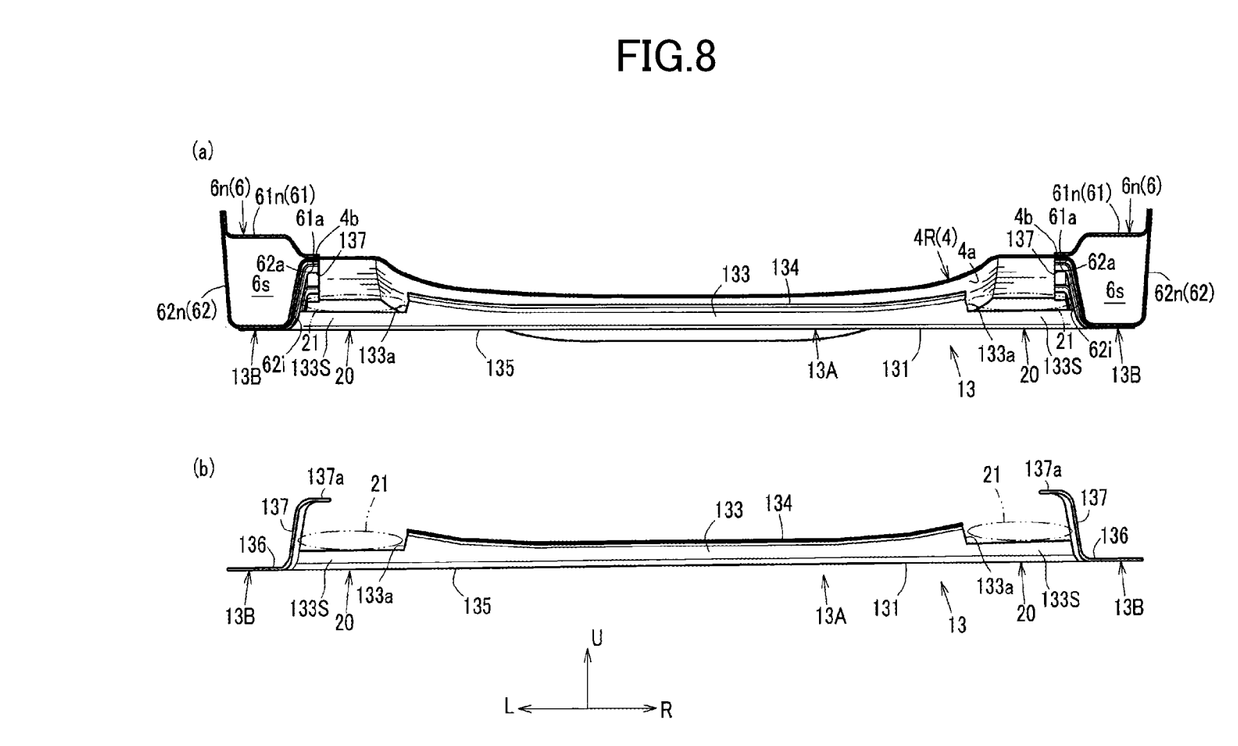
FIGS. 8(a) and 8(b) are, respectively, a sectional view of a relevant part taken along the line B-B in FIG. 2, and a back view of the rear-side cross member.
Figure 9:
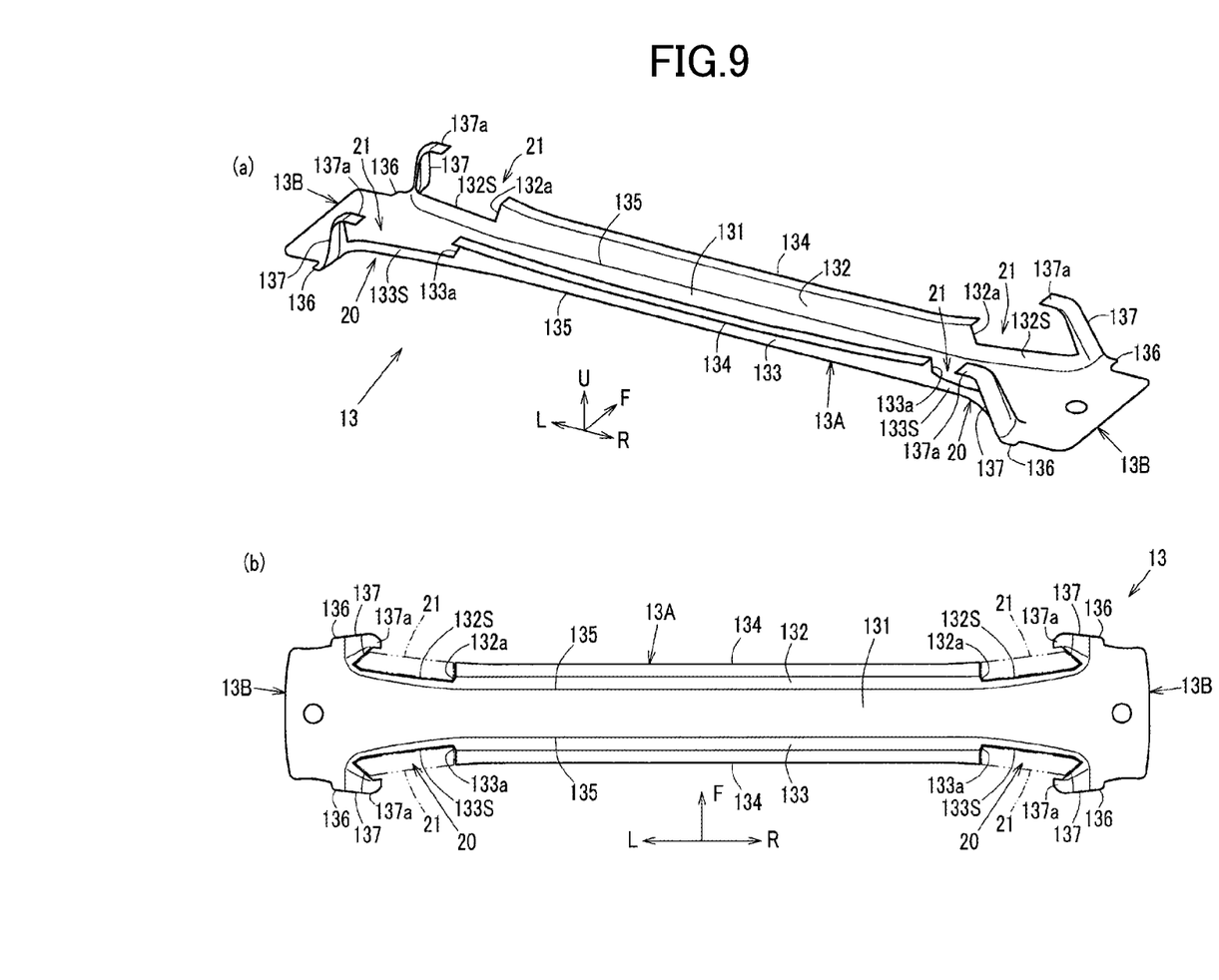
FIGS. 9(a) and 9(b) are, respectively, a perspective view of the rear-side cross member when viewed obliquely downwardly from behind and above the right side thereof, and a top plan view of the rear-side cross member.

As shown in FIGS. 1 and 2, the frame member 6 comprises an upwardly-convexed cross-sectionally hat-shaped frame-member upper panel 61 (see FIGS. 1 and 8(a)), and a downwardly-convexed cross-sectionally hat-shaped frame-member lower panel 62 (see FIGS. 2 and 8(a)) over the entire region thereof in the vehicle longitudinal direction, over the entire region thereof in the vehicle longitudinal direction. The frame-member upper panel 61 and the frame-member lower panel 62 are formed, respectively, with a joint flange 61a and a joint flange 62a at vehicle-widthwise inner ends thereof (see FIGS. 1 to 3 and 8(a)). The joint flanges 61a, 62b and a corresponding one of opposed vehicle-widthwise outer ends 4b of the rear floor panel 4 are triply joined together by welding, in a state in which the vehicle-widthwise outer end 4b is sandwiched between the joint flanges 61a, 62b (FIGS. 3 and 8(a)).

As shown in FIG. 2, a pair of rear wheel houses 7 are provided, respectively, on vehicle-widthwise outer sides of the pair of frame members 6. Each of the rear wheel houses 7 is constructed by joining a non-illustrated rear-wheel-house outer panel and a rear-wheel-house inner panel 7a together.

As shown in FIGS. 1 and 2, an upper rear cross member 11 (see FIG. 1) and a lower rear cross member 11 (see FIG. 2) are joined and fixed, respectively, to upper and lower sides of the rear floor panel 4 in a boundary area between the rear-floor front portion 4F and the rear-floor rear portion 4R, by spot welding or the like. Each of these cross members 11, 12 is a rear cross member (so-called "No. 4 cross member") extending in the vehicle width direction to couple the bilateral frame embers 6 together in the vehicle width direction. A closed cross-section 11s and a closed cross-section 12s are formed, respectively, between the upper rear cross member 11 and the rear floor panel 4 and between the lower rear cross member 12 and the rear floor panel 4, such that they overlap each other in an up-down direction.

As shown in FIG. 2, the rear-floor rear portion 4R is further provided with a rear-side rear cross member 13 (so-called "No. 4.5 cross member") extending in the vehicle width direction across the concave portion 4a of the rear-floor rear portion 4R to couple the bilateral frame members 6 together in the vehicle width direction. The rear-side rear cross member 13 is joined and fixed to the rear-floor rear portion 4R from the side of a lower surface of the rear-floor rear portion 4R. The rear-side rear cross member 13 and the rear floor panel 4 are fixed to form therebetween a closed cross-section 13s extending in the vehicle width direction.

With reference to FIGS. 1 to 3, as the prerequisite structure of the rear vehicle-body structure according to this embodiment, the following description will be ongoingly made in detail, with a focus on the configuration of the above frame member 6.

As shown in FIG. 2, the frame member 6 in this embodiment has a recess 15 formed by concaving a vehicle-widthwise middle of a lower surface of the frame member 6 upwardly, at a vehicle-longitudinal intermediate position thereof, specifically at a position between the rear cross member 12 and the rear-side rear cross member 13.

This recess 15 has an opening 15a formed in a vehicle-widthwise central area of the lower surface of the frame member 6 so as to be opened in the up-down direction (see FIG. 3). This opening 15a is provided to form a damper support portion (15) for fixing a damper D (see FIG. 3) of a non-illustrated rear suspension in a state in which the damper D is inserted into the opening 15a.

That is, the damper support portion (15) in this embodiment is constructed by providing the recess 15 in the frame member 6. In a position P corresponding to this recess 15 of the frame member 6 in the vehicle longitudinal direction (vehicle-longitudinally recess-corresponding position P), the frame member 6 is formed with a widened portion 6A widened in the vehicle width direction as compared to the remaining portion (see FIGS. 2 and 3).

Thus, as shown in FIGS. 2 and 3, in the vehicle-longitudinally recess-corresponding position P of the frame member 6, the closed cross-section 6s (see FIG. 8(a)) of the frame member 6 extending in the vehicle longitudinal direction is formed into a fork shape, i.e., a closed cross-section 6sa on a vehicle-widthwise inner side (vehicle-widthwise inner closed cross-section 6sa) and a closed cross-section 6sb on a vehicle-widthwise outer side (vehicle-widthwise outer closed cross-section 6sb). The vehicle-widthwise inner closed cross-section 6sa and the vehicle-widthwise outer closed cross-section 6sb are formed, respectively, on vehicle-widthwise left and right sides with respect to the damper D insertedly fixed to the recess 15.

Further, as shown in FIG. 2, the frame member is constructed by integrally connecting a plurality of component members in the vehicle longitudinal direction. For example, in the vehicle-longitudinally recess-corresponding position P of the frame member 6, the frame member 6 is partly composed of a damper mounting member 6m (rear suspension mounting member).

As shown in FIG. 3, the damper mounting member 6m comprises: a damper-mounting upper member 61m located on the upper side of the damper mounting member 6m in the vehicle-longitudinally recess-corresponding position P of the frame member 6; a damper-mounting lower member 62m (see FIGS. 2 and 3) located beneath the damper-mounting upper member 61m; a top panel member 65 for allowing the damper D to be mounted to a concave bottom of the recess 15; an outer panel 66 (see FIGS. 1 and 3) forming a vehicle-widthwise outer surface thereof; and a reinforcement panel 30 provided to cover the top of the damper-mounting upper member 61m (see FIGS. 1 and 3).

Further, as shown in FIG. 2, a vehicle-longitudinal mounting portion of the frame member 6 for the rear-side cross member 13 is composed of a rear-side cross member mounting member 6n (hereinafter referred to as "cross member mounting member 6n")

As shown in FIGS. 1 and 2, the cross member mounting member 6n is integrally composed of: a cross member-mounting upper member 61n (see FIGS. 1 and 2) located on the upper side of the cross member mounting member 6n; and a cross member-mounting lower member 62n (see FIG. 2) located beneath the cross member-mounting upper member 61n. As shown in FIG. 2, the cross member mounting member 6n and the aforementioned damper mounting member 6m are continuously arranged in the vehicle longitudinal direction.

Meanwhile, in the above rear vehicle-body structure, the damper D of the rear wheel or rear suspension can undergo up-and-down motion due to a traveling load received from rear wheels, thereby becoming a vibration generation source. Specifically, during traveling of the vehicle, vibrations are input from the symmetric pair of dampers D to the respective damper mounting members 6m of the pair of frame members 6, and transmitted to the rear-side cross member 13 via the respective cross member mounting members 6n, whereafter the vibrations are further transmitted from the rear-side cross member 13 to the rear-floor lower portion 4B, which gives rise to concern that the rear floor panel 4 is vibrated to exert a negative influence on NVH performance.

Therefore, the present inventors focused on the point that, by providing a rigidity difference (difference in spring constant) between given two members attached to each other in a vibration transmission path extending from a vibration generation source toward a vehicle body, i.e., an upstream-side member (vibration transmitting member) located on the upstream side of the vibration transmission path, and a downstream-side member (vibration transmission target member) located on the downstream side of the vibration transmission path, a reflection amount from the upstream-side member to the downstream-side member during vibration transmission can be increased, and further focused on the point that this approach is effective in enhancing an effect of suppressing vibration transmission between the two members, and thereby reducing vibrations transmitted from the vibration generation source toward the vehicle body.

In the following description about this embodiment, the above technical ides of providing a rigidity difference between two members attached to each other, thereby blocking/suppressing/reducing vibration transmission between the two members is applied to an attachment region between the frame member 6 and the rear-side cross member 13. The following description will be made about an example in which an external force (vibration) is input from the damper mounting member 6m (vibration transmitting member) to the rear-side cross member 13 (vibration transmission target member) via the cross member mounting member 6n (intervening member).

Figure 4:
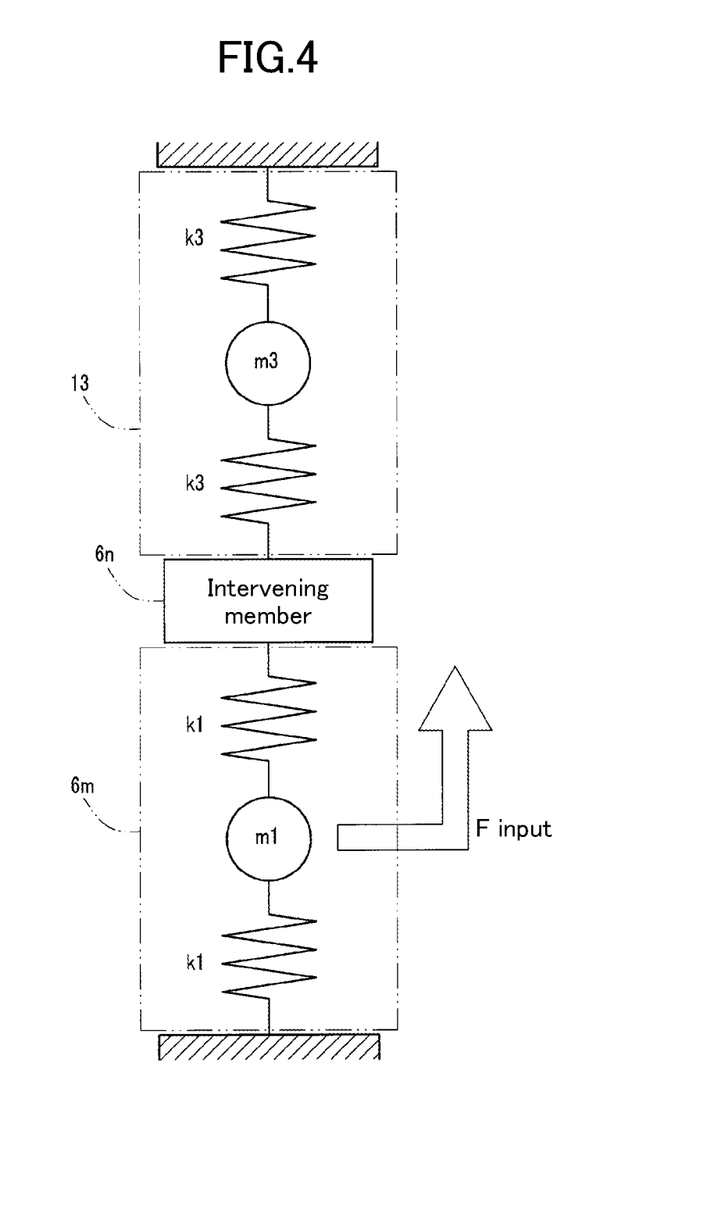
FIG. 4 is a diagram obtained by modeling a vibration transmission path arranged to extend from a damper mounting member to a rear-side cross member via a cross member mounting member, as a mass-spring model having a three-degree-of-freedom system.

The damper mounting member 6m and the cross member mounting member 6n of the frame member, and the rear-side cross member 13 are continuously arranged, in this order, from the upstream side to the downstream side of the vibration transmission path. FIG. 4 is a diagram obtained by modeling these three members as a mass-spring model having a three-degree-of-freedom system. FIG. 4 shows a state in which an external force F is input to the damper mounting member 6m (indicated by the two-dot chain line), in the mass-spring model having a three-degree-of-freedom system.

In FIG. 4, m1 and k1 denote, respectively, rigidity and elasticity of the damper mounting member 6m, and similarly m3 and k3 denote, respectively, rigidity and elasticity of the rear-side cross member 13.

Here, the intervening member in FIG. 4 is shown as an aggregation of rigidity and elasticity elements of the cross member mounting member 6n of the frame member 6, for the sake of simplicity. That is, for the sake of simplicity, the intervening member as the cross member mounting member 6n can be regarded as a member for simply coupling respective spring elements (k1 and k2) of the damper mounting member 6m and the rear-side cross member 13. in this case, the model in FIG. 4 can be substantially handled as a mass-spring model having a two-degree-of-freedom system, obtained by modeling the damper mounting member 6m and the rear-side cross member 13.

Figure 5:
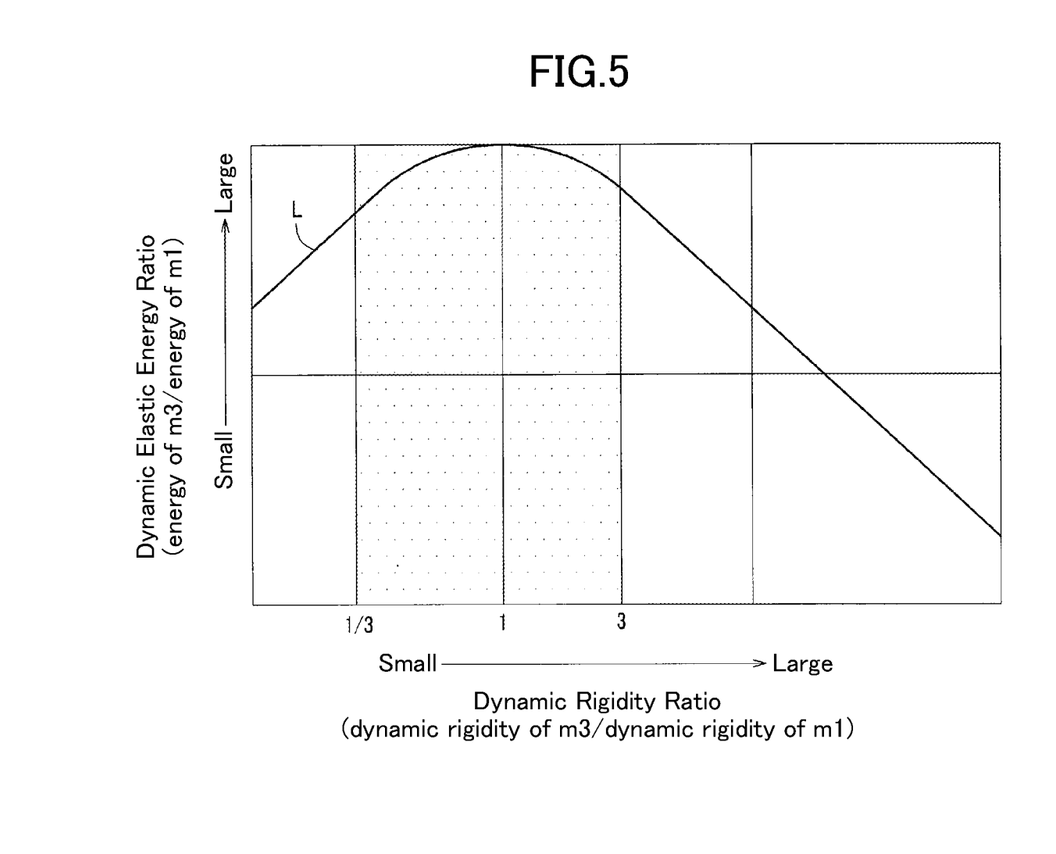
FIG. 5 is a chart showing a relationship between a dynamic rigidity ratio and a dynamic elastic energy ratio of a vibration transmitting member to a vibration transmission target member.

In the chart illustrated in FIG. 5, the horizontal axis represents a dynamic rigidity ratio (the dynamic rigidity of m3/the dynamic rigidity of m1) which means the ratio of the dynamic rigidity of the rear-side cross member 13 to the dynamic rigidity of the damper mounting member 6m, and the vertical axis represents a dynamic elastic energy ratio (the dynamic elastic energy of m3/the dynamic elastic energy of m1) which means the ratio of the dynamic elastic energy of the rear-side cross member 13 to the dynamic elastic energy of the damper mounting member 6m. The chart shows relationship between the two ratios by a waveform L.

Here, the dynamic elastic energy of the damper mounting member 6m and the dynamic elastic energy of the rear-side cross member 13 mean, respectively, vibration energy received by the damper mounting member 6m from the damper, and vibration energy received by the rear-side cross member 13 from the damper mounting member 6m.

In other words, FIG. 5 is a graph showing, by the waveform L, how vibration energy transmitted from the damper mounting member 6m to the rear-side cross member 13 via the cross member mounting member 6n when an external force F is input from the damper D to the damper mounting member 6m in the mass-spring model having a three-degree-of-freedom system, illustrated in FIG. 4, changes according to a rigidity difference (difference in spring constant) between the damper mounting member 6m and the rear-side cross member 13.

As indicated by the waveform L in the graph of FIG. 5, the relationship between the dynamic rigidity ratio and the dynamic elastic energy ratio has a quadratic function-like characteristic in which the dynamic elastic energy ratio exhibits a peak value when the dynamic rigidity ratio is a given value (e.g., 1), and the dynamic elastic energy ratio becomes smaller as the dynamic rigidity ratio is increased or reduced with respect to the given value.

As is evident from this waveform L, as the rigidity difference between the damper mounting member 6m and the rear-side cross member 13 is set to a larger value or a smaller value with respect to the given value, a rebound amount (reflection amount) of vibration becomes larger. As just described, a design method for setting the rigidity difference to a larger value or a smaller value with respect to the given value could be said to be effective in enhancing an effect of reducing dynamic elastic energy transmitted from the damper mounting member 6m to the rear-side cross member 13 via the cross member mounting member 6n.

Figure 6:
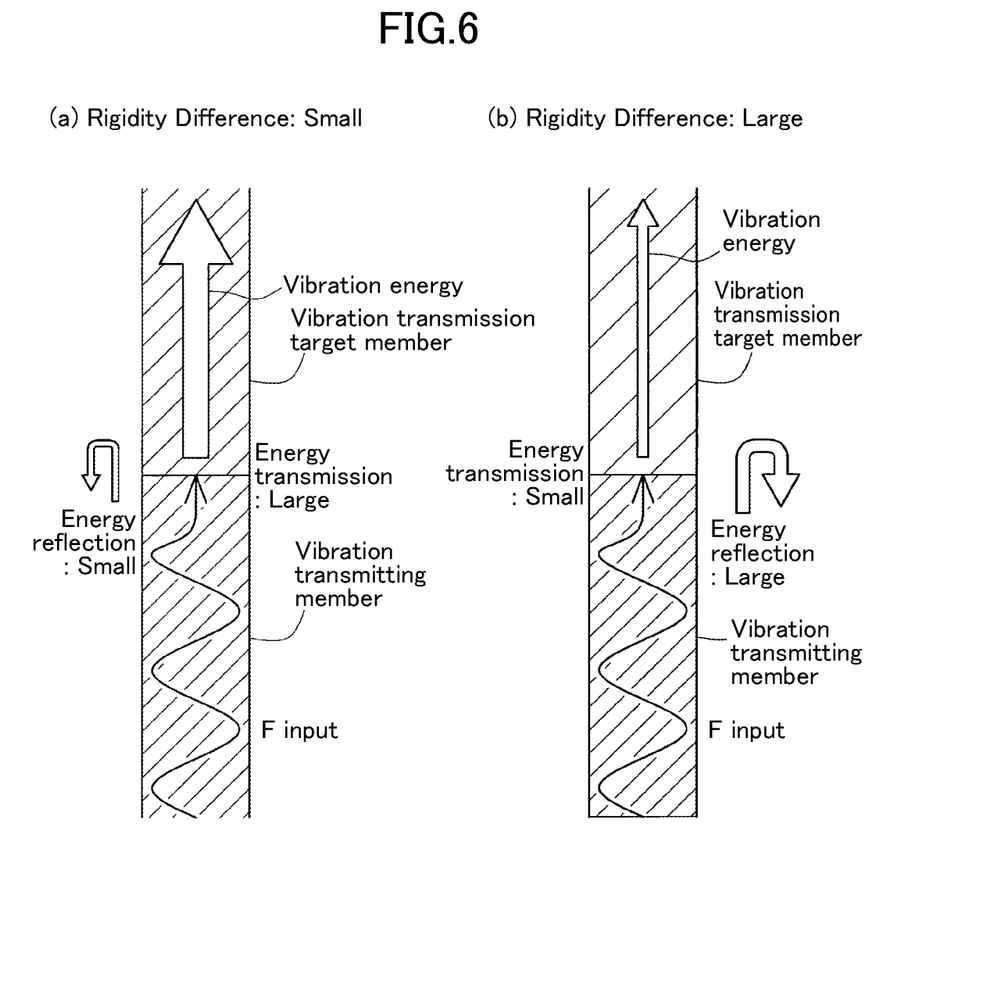
FIGS. 6(a) and 6(b) are, respectively, two schematic diagrams each showing a state of vibration energy transmission between a vibration transmitting member and a vibration transmission target member, according to the level of a rigidity difference between the two members.

More specifically, as is evident from the waveform L in FIG. 5, when the dynamic rigidity ratio in FIG. 5 is close to 1, i.e., the rigidity difference between the vibration transmitting member and the vibration transmission target member is small, in a situation where an external force is locally applied to a part of the vibration transmission target member, the reflection amount, i.e., the amount of vibration energy to be reflected by the vibration transmission target member, becomes smaller, as shown in FIG. 6(a). That is, in this case, a transmission amount (receiving amount) of vibration energy from the vibration transmitting member to the vibration transmission target member becomes larger.

On the other hand, when the dynamic rigidity ratio in FIG. 5 is far from 1, i.e., the rigidity difference between the vibration transmitting member and the vibration transmission target member is large, the reflection amount of vibration energy in the vibration transmission target member becomes larger, as shown in FIG. 6(b). That is, in this case, the transmission amount of vibration energy from the vibration transmitting member to the vibration transmission target member becomes smaller.

It should be noted here that, in this embodiment, the term "reflection" includes not only a state in which vibration energy is rebounded in a direction opposite to an input direction from the vibration transmitting member to the vibration transmission target member, but also a state in which vibration energy is released in a direction different from the opposite direction (e.g., toward a rear end of the frame member 6).

In order for providing the rigidity difference between the vibration transmitting member and the vibration transmission target member, it is conceivable to modify at least one of the two members in terms of rigidity (spring constant).

For example, in order to increase rigidity relative to the rear-side cross member 13, it is conceivable to robustly construct the frame member 6, e.g., by additionally providing a reinforcement panel to the existing frame member 6 (the frame member 6 in the aforementioned prerequisite structure), or by increasing the wall thickness of the existing frame member 6. In this case, however, there is concern about increase in weight of the rear of the vehicle body.

On the other hand, in order to reduce rigidity relative to the rear-side cross member 13, it is conceivable to construct the frame member 6 such that the rigidity thereof is reduced with respect to the existing frame member 6 (the frame member 6 in the aforementioned prerequisite structure). In this case, however, there is concern that the resulting frame member 6 has difficulty in fulfilling a function as a load path of collision load to the side sill 2 (vehicle front) during a rear-end collision of the vehicle.

Therefore, in this embodiment, the rear-side cross member 13 as the vibration transmission target member is reduced in terms of rigidity, relative to the frame member 6 (damper mounting member 6m). In particular, this embodiment employs a configuration in which the vicinity (given surrounding area/given surrounding region) of an attachment portion of the rear-side cross member 13 to be attached to the frame member 6 (the cross member mounting member 6n) is reduced in terms of rigidity, thereby providing the rigidity difference between the two members.

Mainly with reference to FIGS. 7, 8(a), 8(b), 9(a) and 9(b), a structure embodying the above technical idea will be described below. This specific structure is a structure in which a low rigidity part 20 whose rigidity is reduced relative to that of the damper mounting member 6m is provided in the vicinity of an attachment portion of the rear-side cross member 13 with respect to the cross member mounting member 6n, in the aforementioned prerequisite structure.

The rear-side cross member 13 is integrally composed of a cross member body 13A extending in the vehicle width direction, and a frame member-associated attachment portion 13B extendingly provided at each of opposite ends of the cross member body 13A.

The cross member body 13A is integrally composed of: a lower wall portion 131 forming a lower surface of the rear-side cross member 13; a vertical wall-shaped front wall portion 132 (FIGS. 9(a) and 9(b)) and a vertical wall-shaped rear wall portion 133 (FIGS. 9(a) and 9(b)) extending upwardly, respectively, from front and rear edges of the lower wall portion 131; and a pair of flanges 134 extending, respectively, from upper ends of the front wall portion 132 and the rear wall portion 133 in opposite sides of the vehicle longitudinal direction (in the vehicle front direction and the vehicle rear direction) and joined to the lower surface of the rear-floor rear portion 4R. The lower wall portion 131 and each of the front and rear wall portions 132, 133 are continuously joined together through a ridge 135 extending along the vehicle width direction. Each of the two ridges 135 between the lower wall portion 131 and respective ones of the front and rear wall portions 132, 133 corresponds to a bended portion (corner portion) formed by bending, along the vehicle width direction, a non-illustrated steel plate serving as a rear-side cross member-forming member during shaping of the rear-side cross member 13.

The frame member-associated attachment portion 13B is formed in a flange shape to be attached to a flat seating face-like lower surface of the frame member 6 the cross member mounting member 6n, and at least a vehicle-widthwise inner region of the frame member-associated attachment portion 13B is formed with a leg connection portion 136 extending in the vehicle longitudinal direction.

The frame member-associated attachment portion 13B is formed with a pair of front and rear legs 137 extending upwardly from a vehicle-widthwise inner end of the leg connection portion 136.

Figure 7:
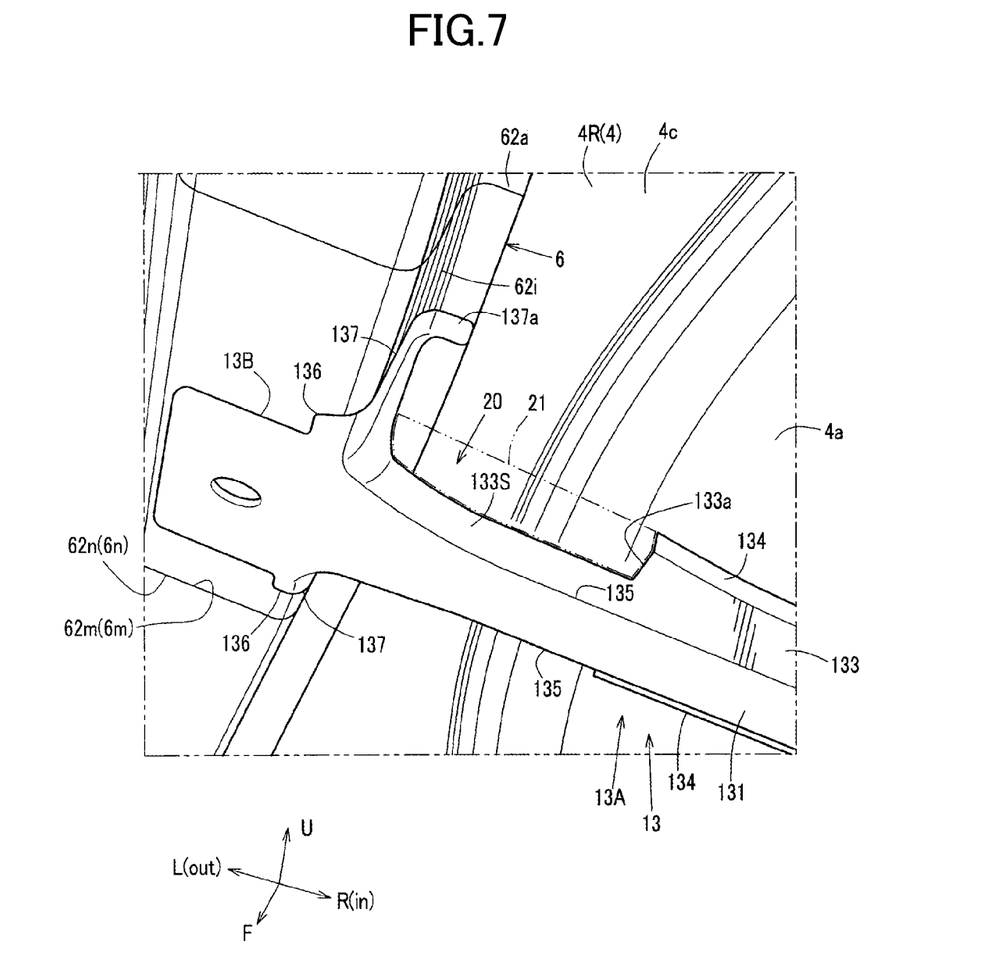
FIG. 7 is a perspective view of an attachment region between the rear-side cross member and a rear side frame, when viewed obliquely upwardly from the side of a rear end of the vehicle.

As shown in FIGS. 7 and 8(a), each of the pair of front and rear legs 137 extends upwardly along a wall surface 62a of the frame member lower panel 62 (cross member-mounting lower member 62n) facing inwardly in the vehicle width direction (a vehicle-widthwise inner wall surface 62i of the frame member lower panel 62 (cross member-mounting lower member 62n)), wherein an upper portion thereof is bended to form a flange 137a extending inwardly in the vehicle width direction. The flange 137a formed in the leg 137 is connected to the joint flange 62a of the frame member lower panel 62 connected to the vehicle-widthwise outer end 4b of the rear floor panel 4 (see FIGS. 7 and 8(a)).

That is, the pair of front and rear legs 137 are provided independently in spaced-apart relation in a mutually non-continuous manner on vehicle-longitudinal opposite sides with respect to the cross member body 13A.

As shown in FIGS. 7 to 9(b), in this embodiment, in each of opposite end portions/opposite end regions of the cross member body 13A in the vicinity of and on a vehicle-widthwise inner side with respect to the frame member-associated attachment portion 13B on the vehicle-widthwise outer side of the cross member body 13A, a concave notch 21 is formed in each of vehicle-longitudinal opposite sides of each of the opposite end portions of the cross member body 13A, wherein the low rigidity part 20 is composed of these concave notches 21.

The low rigidity part 20 is constructed by forming the cross member body 13A such that, in the vicinity of the frame member-associated attachment portion 13B, the front and rear flanges 134 are not formed, and parts of the front and rear wall portions 132, 133 are not formed, while leaving the ridges 135 extending in the vehicle width direction between the lower wall portion 131 and respective ones of the front and rear wall portions 132, 133, so as to form a concavely-notched font wall area 132S and a concavely-notched rear wall area 133S.

Each of the concavely-notched font and rear wall area 132S, 133S is formed in a stepped shape (notched shape) via a respective one of two step sections 132a, 133a, with respect to a vehicle-widthwise central region of the cross member body 13A, and is continuously formed from the respective one of two step sections 132a, 133a to a corresponding one of the legs 137, along the vehicle width direction.

Meanwhile, the aforementioned concave portion 4a corresponding to a spare tire pan is formed in the central region of the rear-floor rear portion 4R such that it bulges downwardly (see FIGS. 1 and 2), and the cross member body 13A is configured such that a central region thereof on the vehicle-widthwise inner side with respect to the low rigidity part 20 formed at each of the vehicle-widthwise opposite ends thereof is joined to the lower surface of the rear-floor rear portion 4R through the front and rear flanges 134, as shown in FIGS. 2, 7 and 8(a).

On the other hand, as mentioned above, the low rigidity part 20 is constructed by forming the cross member body 13A such that a space is defined downwardly with respect to the rear-floor rear portion 4R, without forming the flanges 134 to be connected to the lower surface of the rear-floor rear portion 4R (see FIGS. 2, 7 and 8(a)).

Based on the configuration having this low rigidity part 20, the dynamic rigidity ratio of the rear-side cross member 13 to the frame member 6 (damper mounting member 6m) is set to a value lower than a given value (in this embodiment, 1). Further, by leaving the ridges 135 between the lower wall portion 131 and respective ones of the concavely-notched front and rear wall areas 132S, 133S, the dynamic rigidity ratio is set to become 0.3 or more.

As shown in FIGS. 1 to 3, the rear vehicle-body structure according to the above embodiment comprises: a symmetric pair of frame members 6 (rear side frames) (see FIG. 2) extending in a vehicle longitudinal (front-rear) direction along respective lateral sides of the rear of the vehicle body;

a rear floor panel 4 (floor panel) coupling the symmetric pair of frame member 6 together in a vehicle width direction; and a rear-side rear cross member 13 (cross member) bridging the symmetric pair of frame members 6 in the vehicle width direction and connected to a lower surface of the rear floor panel 4, wherein an attachment region between each of the frame members 6 and the rear-side rear cross member 13 is provided with a low rigidity part 20 (rigidity difference generation means) to generate a rigidity difference between the frame member 6 and the rear-side cross member 13 (see FIGS. 2, 7, 8(a), 8(b), 9(a) and 9(b)).

In the rear vehicle-body structure having the above feature, vibrations input from rear wheels to the rear-side cross member 13 through the frame members 6 and transmitted from the rear-side rear cross member 13 to the rear floor panel 4 (i.e., to a luggage compartment) can be blocked before being input from the frame members 6 to the rear-side rear cross member 13.

In the above embodiment, the low rigidity part 20 (rigidity difference generation means) is configured to allow the rear-side rear cross member 13 to be reduced in terms of rigidity, relative to the frame member 6, in the attachment region between the frame member 6 and the rear-side rear cross member 13 (see FIGS. 2, 7, 8(a), 8(b), 9(a) and 9(b)).

According to this feature, in order for generating the rigidity difference between the frame member 6 and the rear-side rear cross member 13, by reducing the rear-side rear cross member 13 in terms of rigidity, relative to the frame member 6, it becomes possible to obtain a vibration reduction effect while reducing the weight of the vehicle body, as compared to a case where the rigidity of the rear-side rear cross member 13 is increased, e.g., by forming the frame member 6 to have a larger wall thickness, or additionally providing a reinforcement member.

In the above embodiment, the rear-side rear cross member 13 has a lower wall portion 131, a front wall portion 132 and a rear wall portion 133 forming, respectively, a lower surface, a front surface and a rear surface of the rear-side rear cross member 13, and flange portion 134 (joint portion joined to the rear floor panel 4, wherein the lower wall portion 131 and each of the front and rear wall portions 132, 133 are continuously formed through a ridge 135 extending in the vehicle width direction, and wherein the vicinity of an attachment portion of the rear-side rear cross member 13 with respect to the frame member 6 has a concave notch 21 formed to define a space with respect to the rear floor panel 4 without forming the flanged 134, while leaving the ridge 135 (see FIGS. 2, 7, 8(a), 8(b), 9(a) and 9(b)).

According to this feature, the vicinity of the attachment portion of the rear-side rear cross member 13 with respect to the frame member 6 is formed such that a space is defined downwardly with respect to the lower surface of the rear floor panel 4, without forming the flanges 134 to be connected to the lower surface of the rear floor panel 4, so that it is possible to reduce the rigidity of the rear-side rear cross member 13, relative to the frame member 6 (damper mounting member 6m), thereby obtaining the effect of reducing vibration transmitted from the frame member 6 to the rear-side rear cross member 13.

Further, when a space is defined with respect to the lower surface of the rear floor panel 4, in the vicinity of the attachment portion of the rear-side rear cross member 13 with respect to the frame member 6, the ridges 135 are left, so that it is possible to reduce the rigidity of the rear-side rear cross member 13, while ensuring required rigidity for the rear-side rear cross member 13.

Further, the rear-side rear cross member 13 is disposed beneath the rear floor panel 4 such that it crosses the concave portion 4a formed to bulge downwardly, in the central region of the rear floor panel 4. As such a structure of the vicinity of the attachment portion of the rear-side rear cross member 13 with respect to the frame member 6, each of the concavely-notched front and rear wall areas 132S, 133S is formed to define a space downwardly with respect to the lower surface of the rear floor panel 4, without forming the flanges 134 to be joined to the lower surface of the rear floor panel 4. This makes it possible to eliminate a need for forming an upper end portion of the vicinity of the attachment portion of the rear-side rear cross member 13 with respect to the frame member 6, to have a complicated shape which crosses a boundary region between the concave portion 4a and a flat portion 4c (see FIG. 7) located on an outer periphery of the concave portion 4a in bottom view, thereby enhancing formability of the rear-side rear cross member 13.

In the above embodiment, the attachment portion of the rear-side rear cross member 13 with respect to the frame member 6 has a leg 137 (vehicle-widthwise inner surface joint portion) joined to a vehicle-widthwise inner wall surface 62i (vehicle-widthwise inner surface) of the frame member 6, wherein the legs 137 are formed only on respective sides in the vehicle longitudinal direction across the lower wall portion 131 of the rear-side rear cross member 13, and wherein the concave notch 21 is formed to extend along the vehicle width direction until a vehicle-widthwise outer edge thereof reaches the legs 137 (see FIGS. 7 and 8(a)).

According to this feature, in the vicinity of the attachment portion of the rear-side rear cross member 13 with respect to the frame member 6, the concave notch 21 is formed to extend along the vehicle width direction until the vehicle-widthwise outer edge thereof reaches the legs 137, and the legs 137 are formed only on respective sides in the vehicle longitudinal direction across the lower wall portion 131, so that it is possible to reduce the rigidity of the rear-side rear cross member 13, as comparted to a case where the pair of legs 137 are integrally formed to extend continuously in the vehicle longitudinal direction, and thus reduce the rigidity of the rear-side rear cross member 13, relative to the frame member 6 (damper mounting member 6m).

Further, the legs 137 are joined to the vehicle-widthwise inner wall surface 62i (vehicle-widthwise inner surface) of the frame member 6, so that it is possible to ensure required rigidity for the rear-side rear cross member 13, e.g., ensure joint strength of the rear-side rear cross member 13 to the frame member 6, even if the concave notch 21 is formed such that the vehicle-widthwise outer end thereof reaches the legs 137.

In the above embodiment, the dynamic rigidity ratio of the rear-side rear cross member 13 to the frame member 6 is set to be less than 1 and equal to or greater than 0.3 (see FIG. 5).

According to this feature, the ratio of the dynamic rigidity of the rear-side rear cross member 13 to the dynamic rigidity of the frame member 6 (damper mounting member 6m) is set to a value smaller than 1, so that it is possible to reduce the rear-side rear cross member 13 in terms of rigidity, relative to the frame member 6, and thus increase the rigidity difference between the two members 6, 13.

Thus, it is possible to enhance the effect of blocking vibration transmitted from the frame member 6 (cross member mounting member 6n) to the rear-side rear cross member 13 in the vicinity of the attachment portion of the rear-side rear cross member 13 with respect to the frame member 6, without causing an increase in weight of the vehicle body as in a case where the rigidity of the frame member 6 is relatively increased. Further, the dynamic rigidity ratio is set to 0.3 or more, so that it is possible to ensure required rigidity for the rear-side rear cross member 13.

Further, in the above embodiment, the frame member 6 comprises a damper mounting member 6*m* which supports a damper D equipped in a suspension, and a cross member mounting member 6*n* extending rearwardly from the damper mounting member 6*m* and connected to the rear-side rear cross member 13. In order for deriving the dynamic rigidity ratio, instead of employing a dynamic rigidity ratio of the rear-side rear cross member 13 to the cross member mounting member 6*n* of the frame member 6 directly connected to the rear-side rear cross member 13, a dynamic rigidity ratio of the rear-side rear cross member 13 to the damper mounting member 6*m* located on the upstream side of a vibration transmission path and closer to a vibration generation source, as compared to the cross member mounting member 6*n* is employed, so that it is possible to derive a dynamic rigidity ratio suitable for blocking vibration transmission from the frame member 6 to the rear-side rear cross member 13.

Further, in order for modeling the vibration transmission path extending along the damper mounting member 6*m*, the cross member mounting member 6*n* and the rear-side rear cross member 13, as a mass-spring model having a three-degree-of-freedom system, the cross member mounting member 6*n* is considered as an intervening member simply coupling respective spring elements (k1 and k3) of the damper mounting member 6*m* and the rear-side cross member 13, for the sake of simplicity, and the vibration transmission path is modeled substantially as a mass-spring model having a two-degree-of-freedom system. Thus, it is possible to obtain a quadratic function-like graph waveform as shown in FIG. 5, which facilitates figuring out a peak value of a dynamic elastic energy ratio, thereby making it easy to adequately set the dynamic rigidity ratio.

The present invention is not limited only to the above embodiment, but may be implemented in various other embodiments.

In the above embodiment, in order for providing the rigidity difference between the frame member 6 and the rear-side cross member 13, in the attachment region between the two members 6, 13, the configuration in which the rigidity of the rear-side cross member 13 is relatively reduced is employed. Alternatively, for example, the frame member 6 may be formed to have a higher rigidity as compared to that in the prerequisite structure, such that the rigidity of the frame member 6 becomes relatively higher.

In this case, in order to suppress a situation where the frame member 6 is unnecessarily increased in terms of rigidity and weight, the dynamic rigidity ratio is set to 3 or less (see FIG. 5).

LIST OF REFERENCE SIGNS

4: rear floor panel (floor panel)
6: rear side frame
13: rear-side rear cross member (cross member)
20: low rigidity part (rigidity difference generation means)
21: concave notch
62*i*: vehicle-widthwise inner wall surface (vehicle-widthwise inner surface) of frame member 6
131: lower wall portion
132S: concavely-notched front wall area
133S: concavely-notched rear wall area
134: flange (joint portion)
135: ridge
137: leg (vehicle-widthwise inner surface joint portion)

The invention claimed is:

1. A rear vehicle-body structure of a vehicle, comprising: a symmetric pair of rear side frames extending in a vehicle longitudinal direction along respective lateral sides of a rear of a vehicle body of the vehicle; a floor panel coupling the symmetric pair of rear side frames together in a vehicle width direction; and a cross member bridging the symmetric pair of rear side frames in the vehicle width direction and connected to a lower surface of the floor panel, wherein an attachment region between each of the rear side frames and the cross member is provided with a rigidity difference generation part to generate a rigidity difference between the rear side frame and the cross member.

2. The rear vehicle-body structure as recited in claim 1, wherein the rigidity difference generation part is configured to allow the cross member to be reduced in terms of rigidity, relative to the rear side frame, in the attachment region between the rear side frame and the cross member.

3. The rear vehicle-body structure as recited in claim 2, wherein the cross member has a lower wall portion, a front wall portion and a rear wall portion forming, respectively, a lower surface, a front surface and a rear surface of the cross member, and a joint portion joined to the floor panel, wherein the lower wall portion and each of the front and rear wall portions are continuously formed through a ridge extending in the vehicle width direction, and wherein a vicinity of an attachment portion of the cross member with respect to the rear side frame has a concave notch formed to define a space with respect to the floor panel without forming the joint portion, while leaving the ridge.

4. The rear vehicle-body structure as recited in claim 3, wherein the attachment portion of the cross member with respect to the rear side frame has a vehicle-widthwise inner surface joint portion joined to a vehicle-widthwise inner surface of the rear side frame, wherein the vehicle-widthwise inner surface joint portion is formed on each side in the vehicle longitudinal direction across the lower wall portion of the cross member, and wherein the concave notch is formed to extend along the vehicle width direction until a vehicle-widthwise outer edge thereof reaches the vehicle-widthwise inner surface joint portion.

5. The rear vehicle-body structure as recited in claim 1, wherein a dynamic rigidity ratio of the cross member to the rear side frame is set to 0.3 or more.

6. The rear vehicle-body structure as recited in claim 2, wherein a dynamic rigidity ratio of the cross member to the rear side frame is set to 0.3 or more.

7. The rear vehicle-body structure as recited in claim 3, wherein a dynamic rigidity ratio of the cross member to the rear side frame is set to 0.3 or more.

8. The rear vehicle-body structure as recited in claim 4, wherein a dynamic rigidity ratio of the cross member to the rear side frame is set to 0.3 or more.

9. The rear vehicle-body structure as recited in claim 2, wherein the cross member has a lower wall portion, a front wall portion and a rear wall portion forming, respectively, a lower surface, a front surface and a rear surface of the cross member in the vehicle longitudinal direction, and wherein, in each of vehicle-widthwise opposite outer end portions of the cross member and a surrounding area of an attachment region between the rear side frame and the cross member, the front wall portion and the rear wall portion of the cross member are formed with a concave notch, and wherein the rigidity difference generation part is composed of the concave notch.

10. The rear vehicle-body structure as recited in claim 9, wherein the cross member is configured such that two ridges each continuously extending in the vehicle width direction are formed, respectively, between the lower wall portion and the front portion, and between the lower wall portion and the rear portion, and wherein the concave notch is constructed by forming a concavely-notched region in a part of the front wall portion and in a part of the rear wall portion, while leaving the respective ridges.

* * * * *